United States Patent [19]
Karg

[11] 3,874,401
[45] Apr. 1, 1975

[54] DAMPER CONTROLLER
[76] Inventor: Walter Erwin Karg, 305-188 Colony St., Winnipeg, Manitoba, Canada
[22] Filed: Oct. 4, 1973
[21] Appl. No.: 403,475

[52] U.S. Cl................. 137/77, 126/287.5, 137/456, 251/68, 251/74, 251/115
[51] Int. Cl.......................... F16k 17/38, F23n 3/04
[58] Field of Search ............................... 137/72–75, 137/77; 251/67, 68; 98/1, 86; 126/287.5

[56] References Cited
UNITED STATES PATENTS

| | | | |
|---|---|---|---|
| 306,344 | 10/1884 | Morgan | 251/297 X |
| 1,125,416 | 1/1915 | Watson | 137/72 X |
| 2,242,738 | 5/1941 | Alton | 126/287.5 |
| 2,588,239 | 3/1952 | Hopton et al. | 126/287.5 X |
| 3,283,691 | 11/1966 | Reiter | 137/74 X |
| 3,538,929 | 11/1970 | Botkin | 251/67 X |
| 3,672,386 | 6/1972 | Mochida | 137/77 |

Primary Examiner—Martin P. Schwadron
Assistant Examiner—Richard Gerard
Attorney, Agent, or Firm—Stanley G. Ade

[57] ABSTRACT

A damper is held open by an arm engaged by a pin which in turn is connected to a fusible link. When the link fuses, the pin is withdrawn from the arm by a cam action and the damper drops by gravity to shut off the ducts. A solenoid may also withdraw the pin by connecting same to a smoke detector or the like thus shutting off the damper before the temperature in the duct rises sufficiently to fuse the link.

17 Claims, 6 Drawing Figures

DAMPER CONTROLLER

This invention relates to new and useful improvements in damper control devices.

Fire regulations in most areas require that commercial installations in particular have damper controls installed within the air ducts at predetermined locations and held open by a fusible link so that if a fire occurs in one location, smoke and the like is prevented from passing to other locations via the ducts because the links are adapted to fuse as soon as the temperature rises to a predetermined point which permits the damper to close thus isolating the area.

It should be understood that in large commercial installations, one of the chief dangers is the fact that fire and/or smoke can travel from one section to the other rapidly by means of airconditioning or heating ducts through which a large volume of air is passing and it is for this reason that the automatic damper controls are required in such installations.

However, it will be appreciated that it is desirable to inspect these dampers from time to time and to ascertain whether or not the fusible link has broken, it being understood that there may be many mechanical reason why one link may give way even although the temperature has not risen to the fusing point. Furthermore, if there has been a fire, every damper has to be inspected internally to ascertain whether or not the link has fused and the damper has been closed. If it has, then of course the link has to be restored and the damper held in the open position once again by means of a new fusible link.

Regular inspections of such damer assemblies is extremely time consuming because normally an access panel has to be removed from the duct wall and a visual inspection has to be made of the fusible link. Furthermore if the link has broken, it is usually quite difficult and awkward to replace the link in order to maintain the damper in the open position.

The present invention overcomes all of these disadvantages by providing a control assembly which is situated externally of the duct with the exception of the fusible link and one end of the rod carrying the release arm. Furthermore means are provided on the assembly enabling an inspector to ascertain visually whether the damper is open or closed which, of course, informs the inspector whether the fusible link is intact or has broken.

A further object of the invention is to provide a secondary means whereby the damper can be actuated manually without the link being fused or, alternatively, the damper can be actuated by means of a smoke detector or the like before the temperature within the duct rises to the fusing temperature of the link.

The device is simple in construction, economical in manufacture and otherwise well suited to the purpose for which it is designed.

With the considerations and inventive objects herein set forth in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept, reference being had to the accompanying Figures in which.

In the drawings like characters of reference indicate corresponding parts in the different figures.

Figure 1:
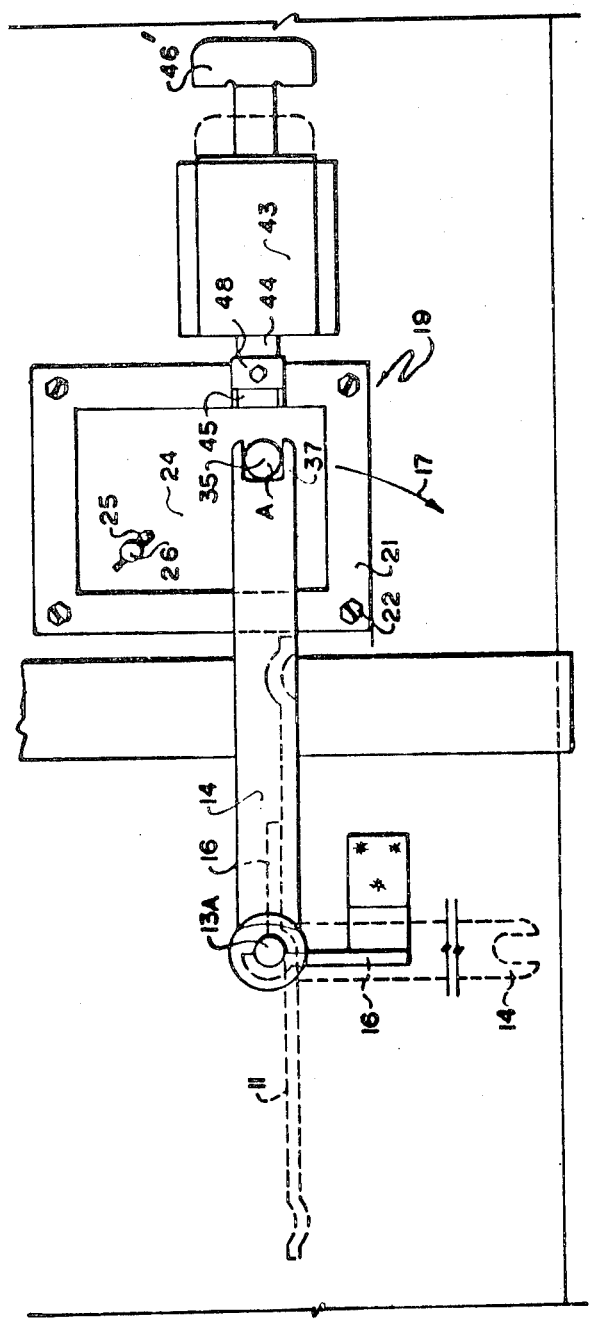
FIG. 1 is a front elevation of a portion of a duct showing the device installed.
Figure 2:
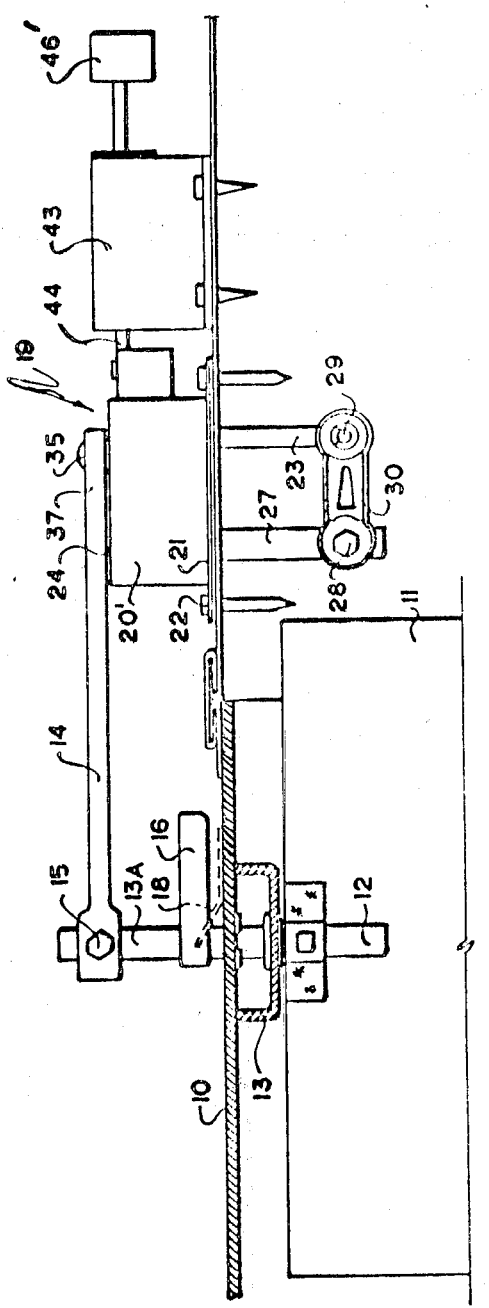
FIG. 2 is a top plan view of FIG. 1 with the duct sectioned in part to show the interior thereof.

Proceeding therefore to describe the invention in detail, reference should first be made to FIGS. 1 and 2 in which 10 illustrates one wall of conventional duct with a damper plate 11 mounted therein upon a rod 12 supported by a bearing bracket 13 and extending outwardly of the duct wall in the form of an extension 13A.

A control arm 14 is secured by one end thereof to the extension 13A by means of clamp bolt 15 and the extension 13A is also provided with a lock strap 16 welded thereto and extending therefrom substantially parallel to the control arm 14. When the position shown in FIGS. 1 and 2, the damper 11 is in the "open" position and does not restrict the passage of air thereby through the duct 10. However, when the damper is in the closed position as will hereinafter be described, the control arm 14 lies substantially vertical as shown in phantom in FIG. 1. The lock strap 16 is also vertical and as it swings downwardly from the position shown in full line in FIG. 1, to the position shown in phantom (in the direction of arrow 17) the lock strap passes by a flat spring member 18 which angulates outwardly of the duct wall 10 as shown in FIG. 2. Once the member 16 passes by the spring member 18, it is locked in this position and cannot be returned to the open position unless the angulated portion of the spring 18 is depressed manually to permit the lock strip 16 to move in the reverse direction together with the control arm 14.

A control assembly collectively designated 19 comprises a casing 20 together with a mounting plate 21 which is secured to the duct wall by metal screws 22 or the equivalent.

Within this casing (see FIGS. 3 and 4) is journalled for partial rotation, a movable fusible link pin 23. This pin is journalled for partial rotation within the front panel 24 and the rear or mounting panel 21 and it is held in position by a cotter pin 25 engaged through the front extending end 26. The rear or inner end of this pin extends beyond the mounting panel 21 and when the control assembly is mounted to the duct wall, it extends through an aperture in the duct wall to within the duct as clearly shown in FIG. 2.

Also extending from the mounting panel 21 parallel to and approximately in the same plane as the movable fusible link pin 23 is a fusible link anchor 27 also in the form of a pin having an upturned inner end 28.

Figure 4:
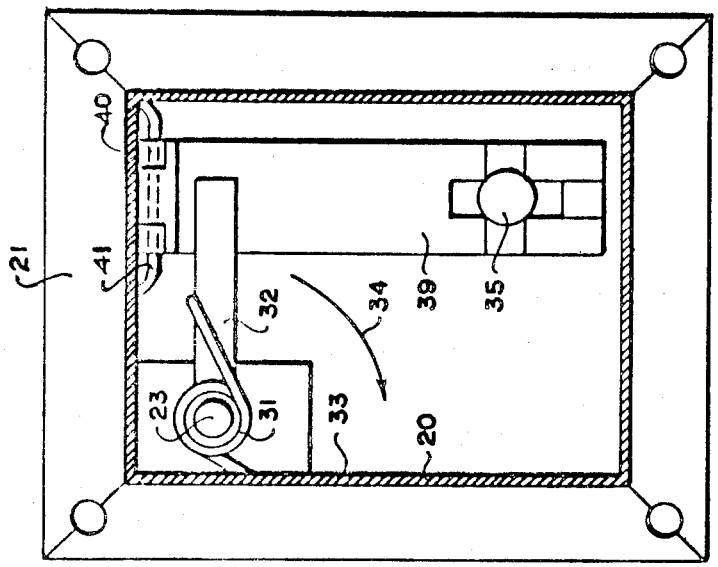
FIG. 4 is a section along the line 4—4 of FIG. 3 with the casing only being in section.
Figure 6:
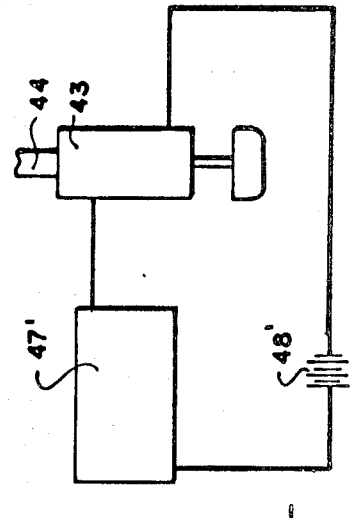
FIG. 6 is a schematic diagram showing one method of actuating the device by the secondary control means.
Figure 3:
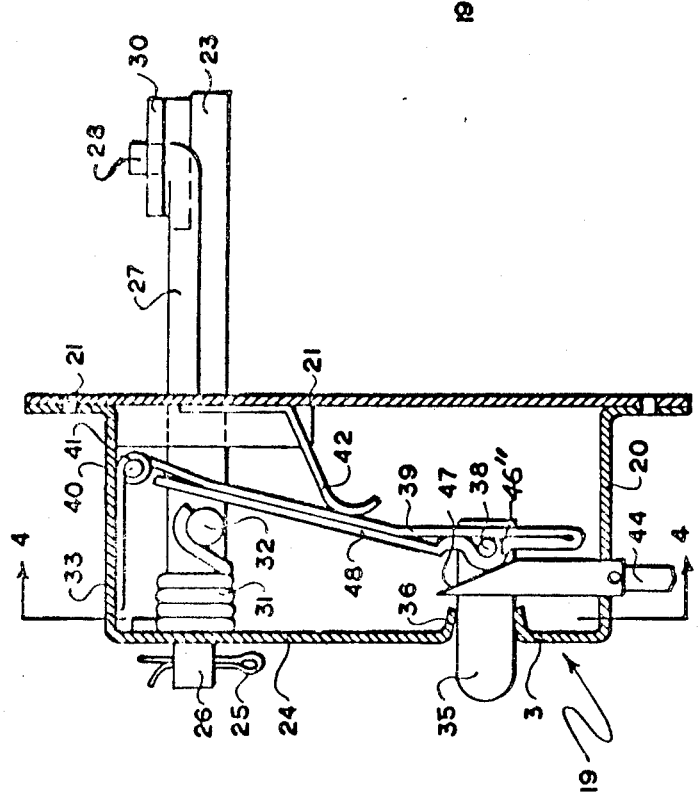
FIG. 3 is a side sectional elevation of the control assembly per se.

The inner end of the fusible link pin 23 is also provided with an upturned inner end 29 and a conventional fusible link 30 engages these upturned ends as clearly shown in FIGS. 2 and 3. A coil spring 31 engages around the pin 23 within the casing and one end of this spring bears against the side wall 33 of the casing as shown in FIG. 4. The other end of the spring engages a cam member in the form of a rod which is secured to and extends at right angles from the fusible link pin 23 and reference character 32 illustrates this cam member.

The spring 31 is positioned so that normally the cam member 32 is being biassed in the direction of arrow 34 and this cam member is substantially horizontal when the end 29 of the pin 23 is vertical in the fusible link engaging position.

It will therefore be appreciated that if the fusible link fuses, spring 31 will move the cam member 32 downwardly in the direction of arrow 34 thus partially rotating the release pin 23 in the same direction.

A release pin 35 extends through the front panel 24 of the casing and is bearably supported by the inturned walls of an aperture formed in the casing and illustrated by reference character 36. This release pin is capable of inward and outward movement within limits and when in the outermost position shown in FIG. 3, is engageable by the bifurcated end 37 of the aforementioned damper control arm 14 as shown in FIG. 1.

A cross pin 38 extends through the release pin 35 adjacent the inner end thereof and a hinge member 39 is engaged around this cross pin 38. This hinge member 39 is in the form of a counter angulated strap hinge journalled for hinging movement by one end wall 40 thereof upon a hinge pin 41 secured to the aforementioned end wall 33 of the casing. This strap hinge member normally inclines across the casing from the rear wall 21 towards the front 24 as clearly shown in FIG. 3, and is held normally in this position by means of a leaf spring 42 secured to the rear wall and bearing upon the rear side of the strap member also as shown in FIG. 3. When in this position, the release pin 35 is in the extended position and the strap hinge member is in bearing contact with the camming member 32 on the fusible link pin 23.

When the release pin is extended as aforesaid, the damper 11 is held in the open position with the control arm 14 substantially horizontal as shown in FIG. 1.

If the fusible link fuses due to reaching a predetermined fusing temperature, spring 31 will rotate the fusible link pin 23 in the direction of arrow 34 thus causing the camming member 32 to move downwardly along the hinge member 39 and due to the angle of inclination of this hinge member, the release pin will be withdrawn inwardly thus disengaging it from the end 37 of the control arm 14. This will permit the damper 11 to close by gravity with the release arm or member 14 taking up the vertical position and the lock strap 16 engaging the spring 18 so that it is held in the closed position until manually released.

It will therefore be apparent that visual inspection externally of the duct will show immediately whether or not the damper is open or closed thus indicating whether the fusible link is intact or has fused or otherwise given way.

If it is necessary to reset, the control assembly 19 can be withdrawn and a new link fitted with the fusible link pin rotated against pressure of spring 31 and held there by means of the fusible link 30. This allows the leaf spring 42 to urge the hinge member in the direction of the front 24 of the casing thus extending pin 35 so that it can be engaged within the end 37 of the control arm 14 which has been moved to the horizontal position for this purpose.

Under certain circumstances, it may be desirable to provide alternate means for operating the damper 11 and in this connection, a solenoid assembly 43 is provided to one side of the control assembly 19.

Figure 5:
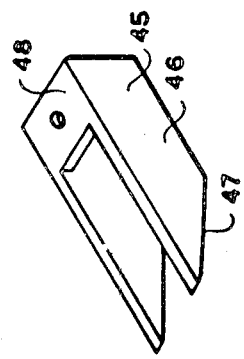
FIG. 5 is an isometric view of the cam member of the secondary control means per se.

This solenoid assembly is conventional inasmuch as it includes a plunger 44 extending therefrom which is connected to a release pin actuating member 45 and shown in detail in FIG. 5.

This actuating member consists of two side wings 46 having chamfered or cammed front portion 47 and having a briding piece 48 by which it may be secured to the solenoid plunger 44.

The plunger also extends rearwardly of the solenoid and terminates in a knob 46' which may be actuated manually if desired.

The camming surface 47 normally engage against a curved portion 46'' of the strap hinge member 39 where it passes around cross pin 38 extending through the release pin 35, it being understood that the two wings 46 pass one upon each side of the release pin 35.

If the plunger 44 is moved inwardly manually by means of the knob 46', the camming surfaces move the release pin inwardly against pressure of release spring 42 thus allowing the damper to close as hereinbefore described.

Alternatively, means such as a smoke detector 47' may be placed in circuit with a source of electric power 48' and the solenoid 43 so that if smoke occurs in the vicinity of the control assembly, the solenoid will move inwardly thus once again actuating the release pin and closing the damper assembly even although the interior temperature of the duct has not reached the fusing temperature of the fusible link 30. Needless to say other exterior stimulae can be placed in circuit with the solenoid 43 depending upon circumstances.

Finally, it should be noted that the set screw 15 permits the damper to be positioned in the duct at any angle between open and closed with the control arm 14 remaining in the horizontal position. This allows the damper to be used as a volume control damper also.

Various modifications can be made within the scope of the inventive concept which is herein disclosed and/or claimed.

What I claim as my invention is:

1. A damper controller for ducts and the like which include a hinged damper therein and a rod mounting the damper and extending externally of the duct; said controller comprising in combination a control arm secured to said rod extending from the duct, and a control assembly mounted adjacent the duct, said control assembly including a casing, a release pin mounted for in and out movement in said casing and detachably engaging the end of said control arm, a fixed fusible link anchor extending from said casing into said duct, a movable fusible link pin also extending from said casing into said duct, a fusible link secured between said anchor and said fusible link pin in the associated duct, said fusible link fusing at a predetermined temperature and being responsive to the temperature of the controlled air in said duct and means operatively connecting said fusible link pin to said release pin whereby said release pin is held engaged with said control arm when said fusible link is in place, and upon fusing of said fusible link said release pin is released for movement in a direction inwardly in said casing to disengage said control arm and release said damper for movement, said means including said fusible link pin being mounted for rotation in said casing, a link pin rotating spring around said link pin reacting between said link pin and said casing, a hinge member mounted by one end thereof in said casing and being operatively secured to release pin by adjacent the other end of said hinge member, and means operatively connected between said fusible link pin and said hinge member adapted to move said release pin inwardly in said casing when said fusible link pin rotates in one direction.

2. The device according to claim 1 which includes spring means in said casing engaging said hinge member and normally biassing same whereby said release pin is held in the extended position relative to said casing.

3. The device according to claim 1 in which said means operatively connected between said fusible link pin and said hinge member includes a cam member extending from said fusible link pin, said hinge means inclining at an angle in said casing from said one end, said cam member engaging said hinge member whereby rotation of said fusible link pin in said one direction causes said cam member to move said hinge member and hence said release pin inwardly of said casing.

4. The device according to claim 2 in which said means operatively connected between said fusible link pin and said hinge member includes a cam member extending from said fusible link pin, said hinge means inclining at an angle in said casing from said one end, said cam member engaging said hinge member whereby rotation of said fusible link pin in said one direction causes said cam member to move said hinge member and hence said release pin inwardly of said casing against the pressure of said spring means.

5. The device according to claim 1 which includes secondary means adapted to move said release pin inwardly without the fusing of said fusible link, said secondary means including a plunger member mounted for endwise movement in said casing, said plunger member being operatively connected to said release pin to move same inwardly when said plunger member is moved inwardly.

6. The device according to claim 2 which includes secondary means adapted to move said release pin inwardly without the fusing of said fusible link, said secondary means including a plunger member mounted for endwise movement in said casing, said plunger member being operatively connected to said release pin to move same inwardly when said plunger member is moved inwardly, said plunger member having a cam surface formed thereon engaging with said hinge member adjacent the connection thereof to said release pin.

7. The device according to claim 3 which includes secondary means adapted to move said release pin inwardly without the fusing of said fusible link, said secondary means including a plunger member mounted for endwise movement in said casing, said plunger member being operatively connected to said release pin to move same inwardly when said plunger member is moved inwardly, said plunger member having a cam surface formed thereon engaging with said hinge member adjacent the connection thereof to said release pin.

8. The device according to claim 4 which includes secondary means adapted to move said release pin inwardly without the fusing of said fusible link, said secondary means including a plunger member mounted for endwise movement in said casing, said plunger member being operatively connected to said release pin to move same inwardly when said plunger member is moved inwardly, said plunger member having a cam surface formed thereon engaging with said hinge member adjacent the connection thereof to said release pin.

9. The device according to claim 5 in which said secondary means includes a solenoid actuator responsive to predetermined external stimulae.

10. The device according to claim 6 in which said secondary means includes a solenoid actuator responsive to predetermined external stimulae.

11. The device according to claim 7 in which said secondary means includes a solenoid actuator responsive to predetermined external stimulae.

12. The device according to claim 8 in which said secondary means includes a solenoid actuator responsive to predetermined external stimulae.

13. The device according to claim 1 which includes a manually releasable lock means cooperating between said control arm and the duct wall to hold the damper in the closed position when released, said lock means including a lock bar extending from said rod and a leaf spring extending from said duct wall, said lock bar passing said leaf spring and deflecting same as said damper closes, said leaf spring acting as a stop engaging said lock bar when said damper is in the closed position.

14. The device according to claim 3 which includes a manually releasable lock means cooperating between said control arm and the duct wall to hold the damper in the closed position when released, said lock means including a lock bar extending from said rod and a leaf spring extending from said duct wall, said lock bar passing said leaf spring and deflecting same as said damper closes, said leaf spring acting as a stop engaging said lock bar when said damper is in the closed position.

15. The device according to claim 5 which includes a manually releasable lock means cooperating between said control arm and the duct wall to hold the damper in the closed position when released, said lock means including a lock bar extending from said rod and a leaf spring extending from said duct wall, said lock bar passing said leaf spring and deflecting same as said damper closes, said leaf spring acting as a stop engaging said lock bar when said bumper is in the closed position.

16. The device according to claim 6 which includes a manually releasable lock means cooperating between said control arm and the duct wall to hold the damper in the closed position when released, said lock means including a lock bar extending from said rod and a leaf spring extending from said duct wall, said lock bar passing said leaf spring and deflecting same as said damper closes, said leaf spring acting as a stop engaging said lock bar when said damper is in the closed position.

17. The device according to claim 8 which includes a manually releasable lock means cooperating between said control arm and the duct wall to hold the damper in the closed position when released, said lock means including a lock bar extending from said rod and a leaf spring extending from said duct wall, said lock bar passing said leaf spring and deflecting same as said damper closes, said leaf spring acting as a stop engaging said lock bar when said damper is in the closed position.

* * * * *